F. B. MARTIN.
CARTON MAKING AND FLAP SEALING MACHINE.
APPLICATION FILED JAN. 14, 1914.
1,136,354.
Patented Apr. 20, 1915.
10 SHEETS—SHEET 3.
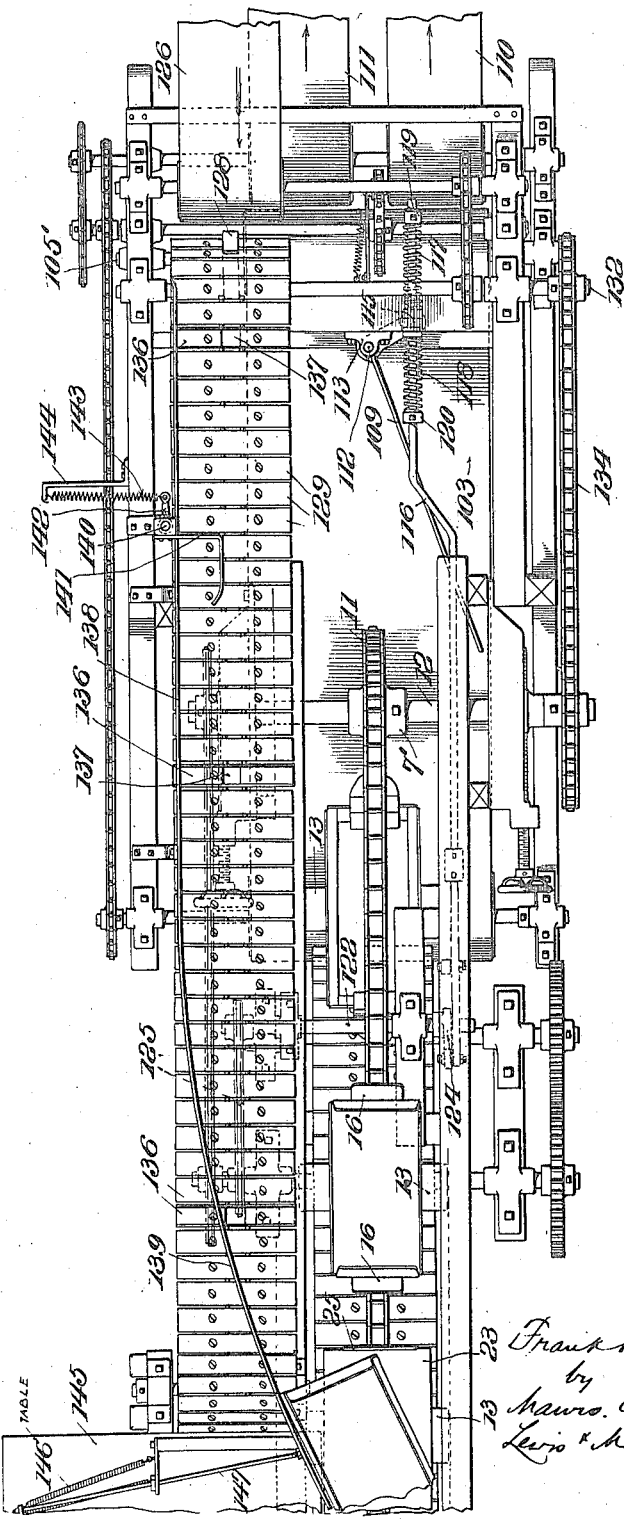

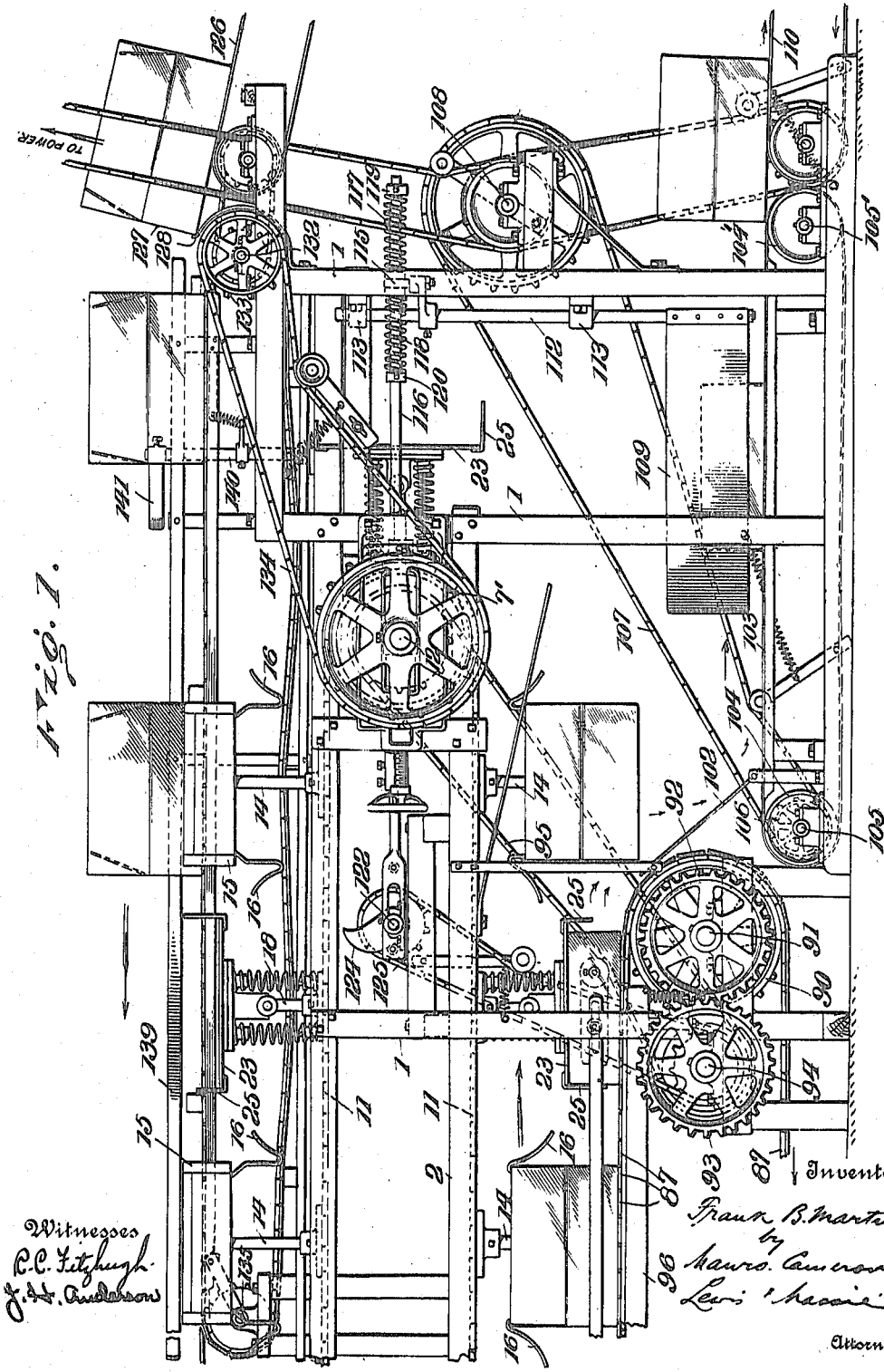

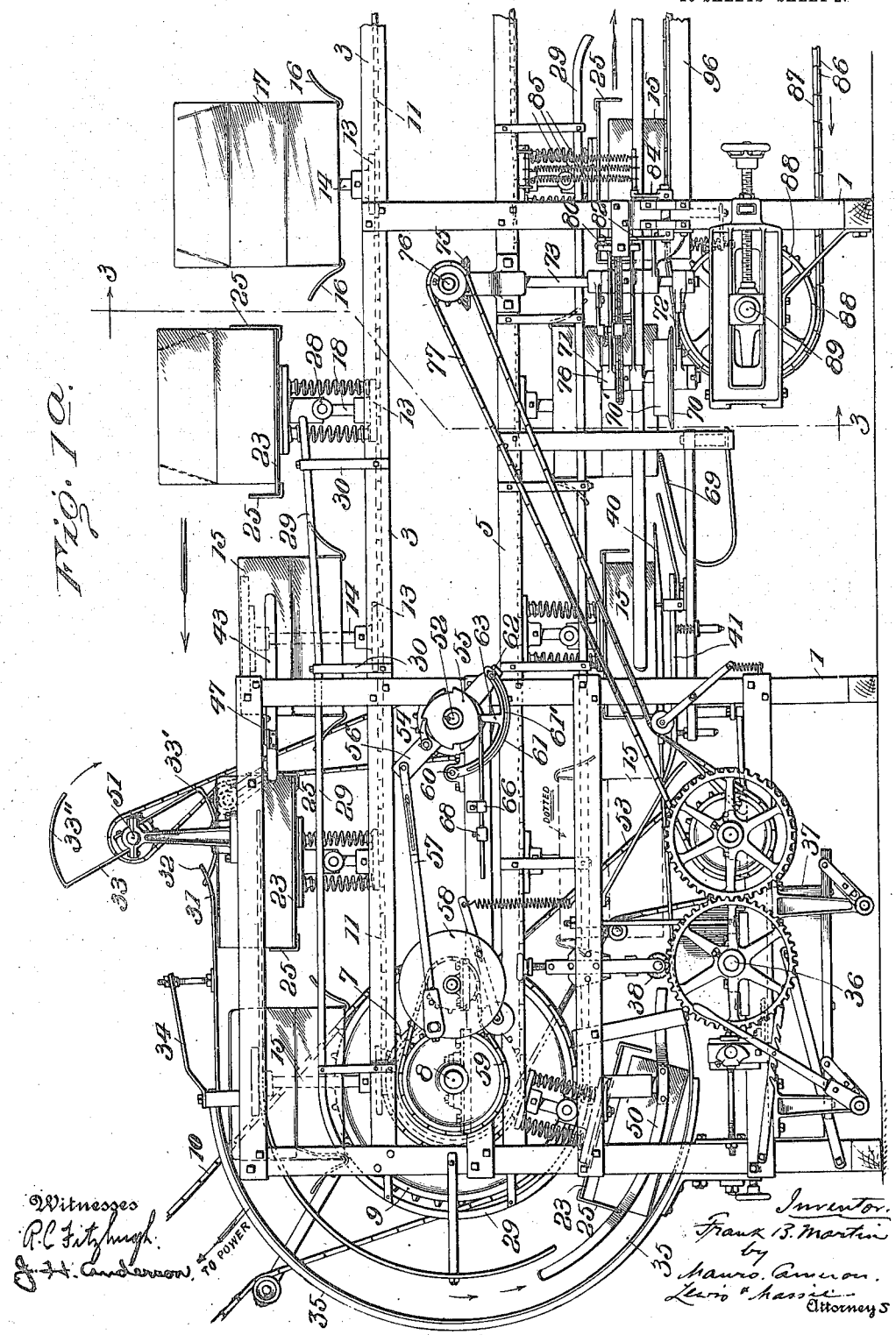

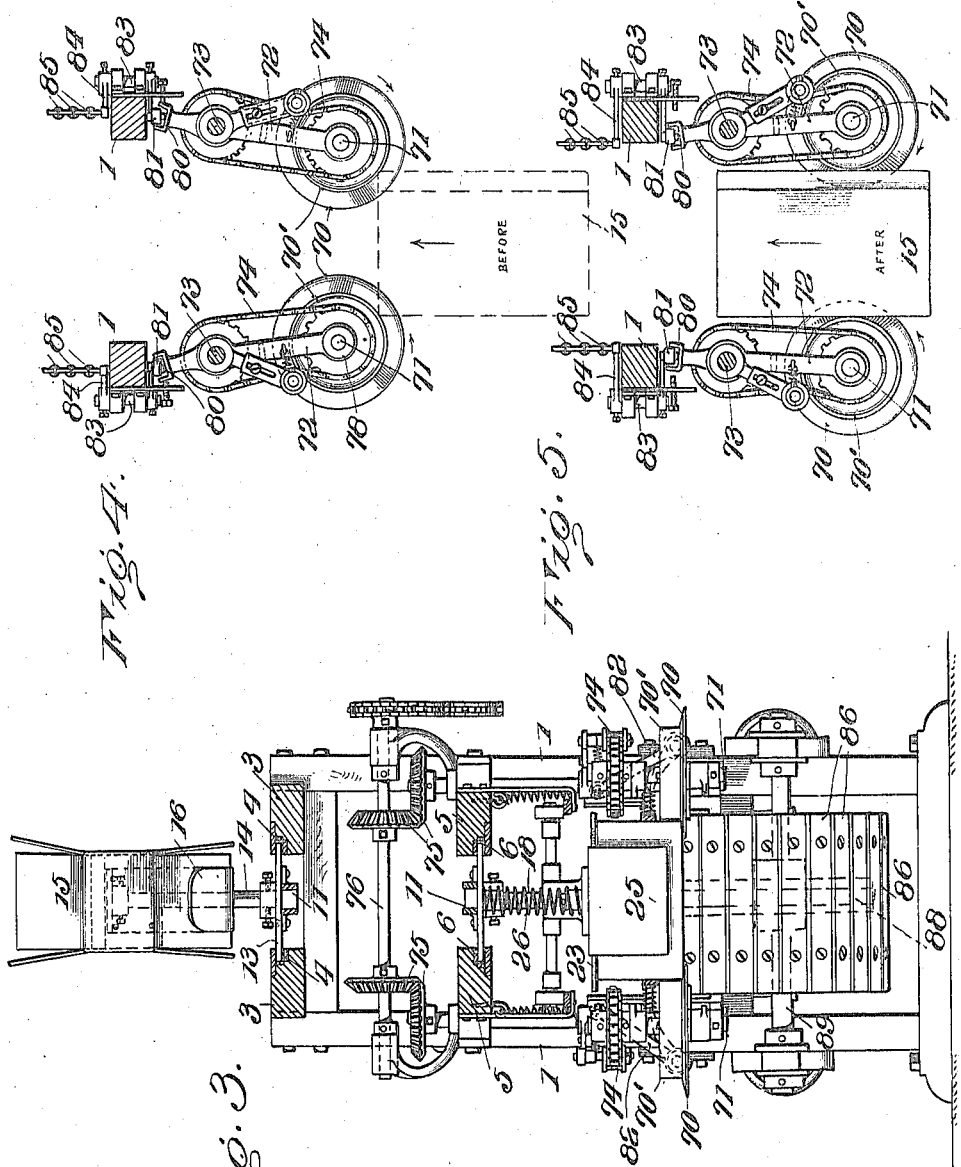

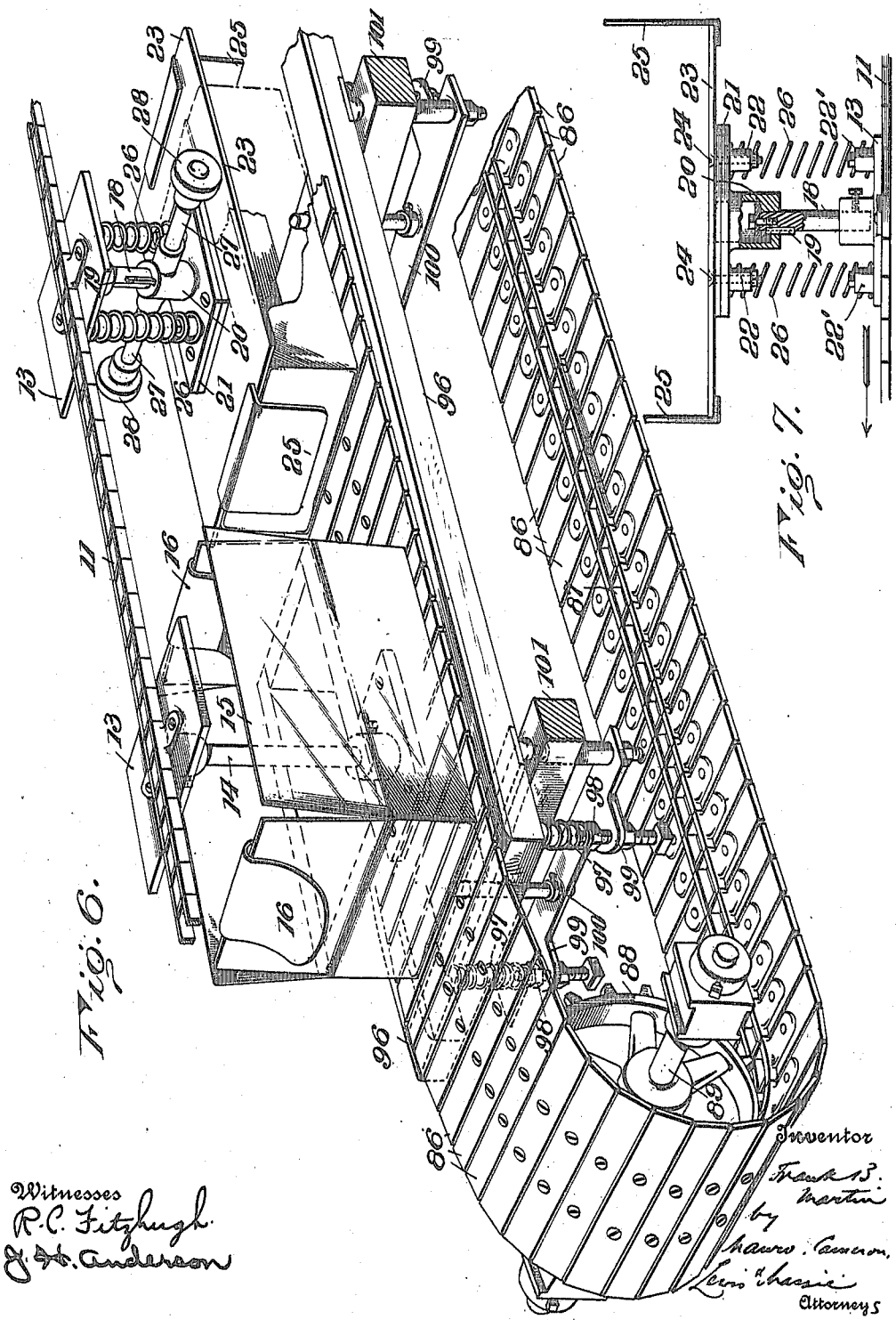

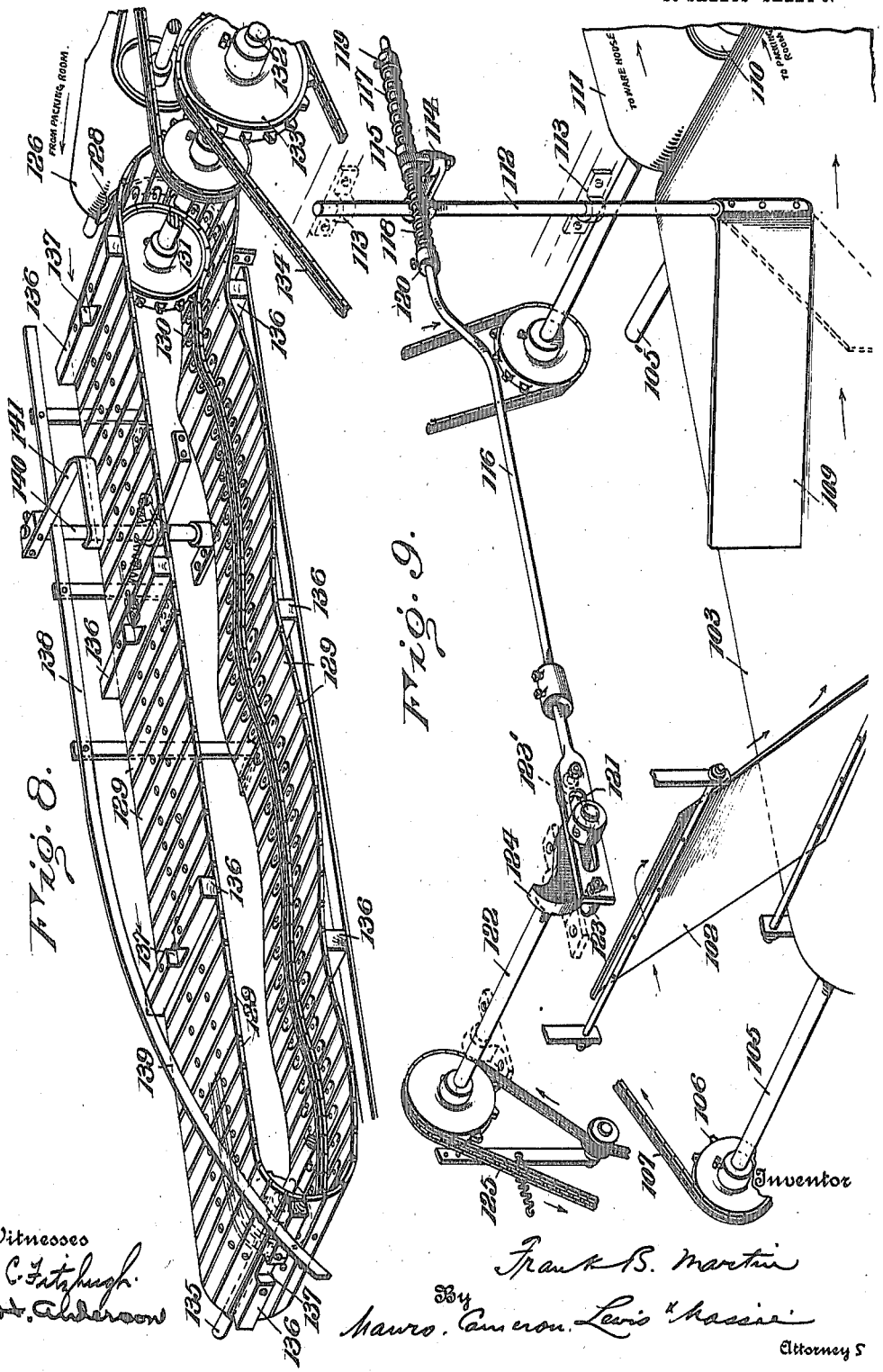

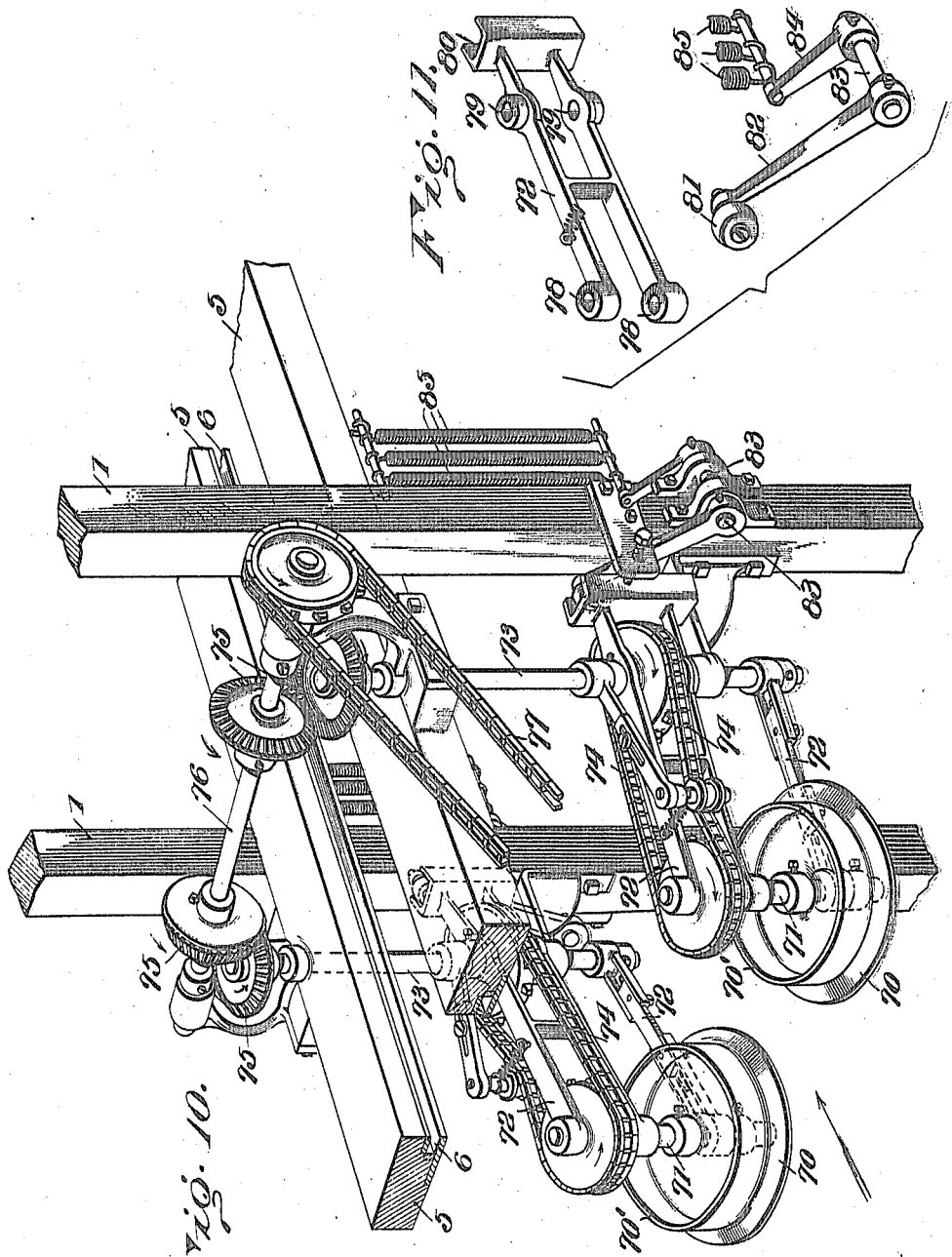

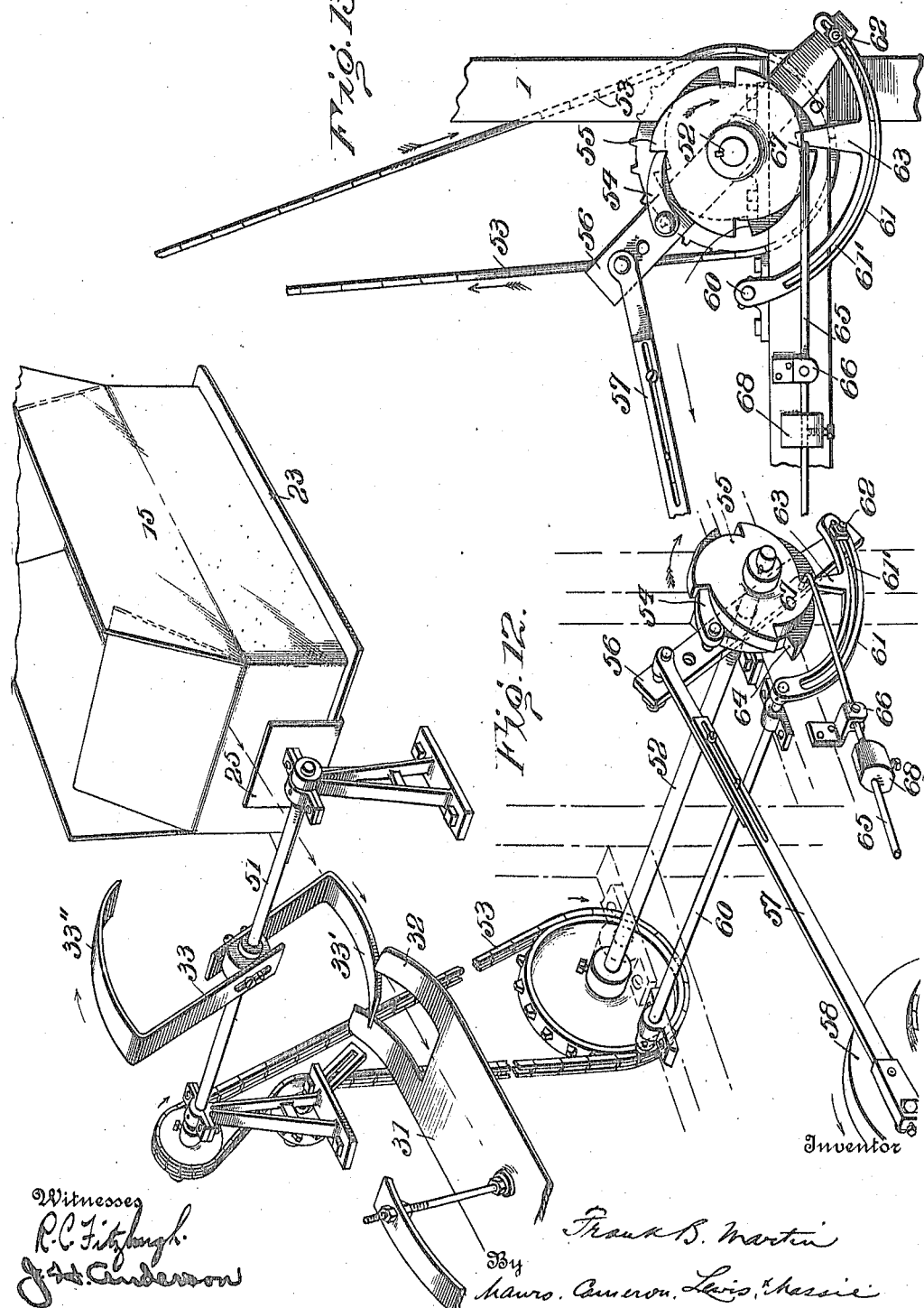

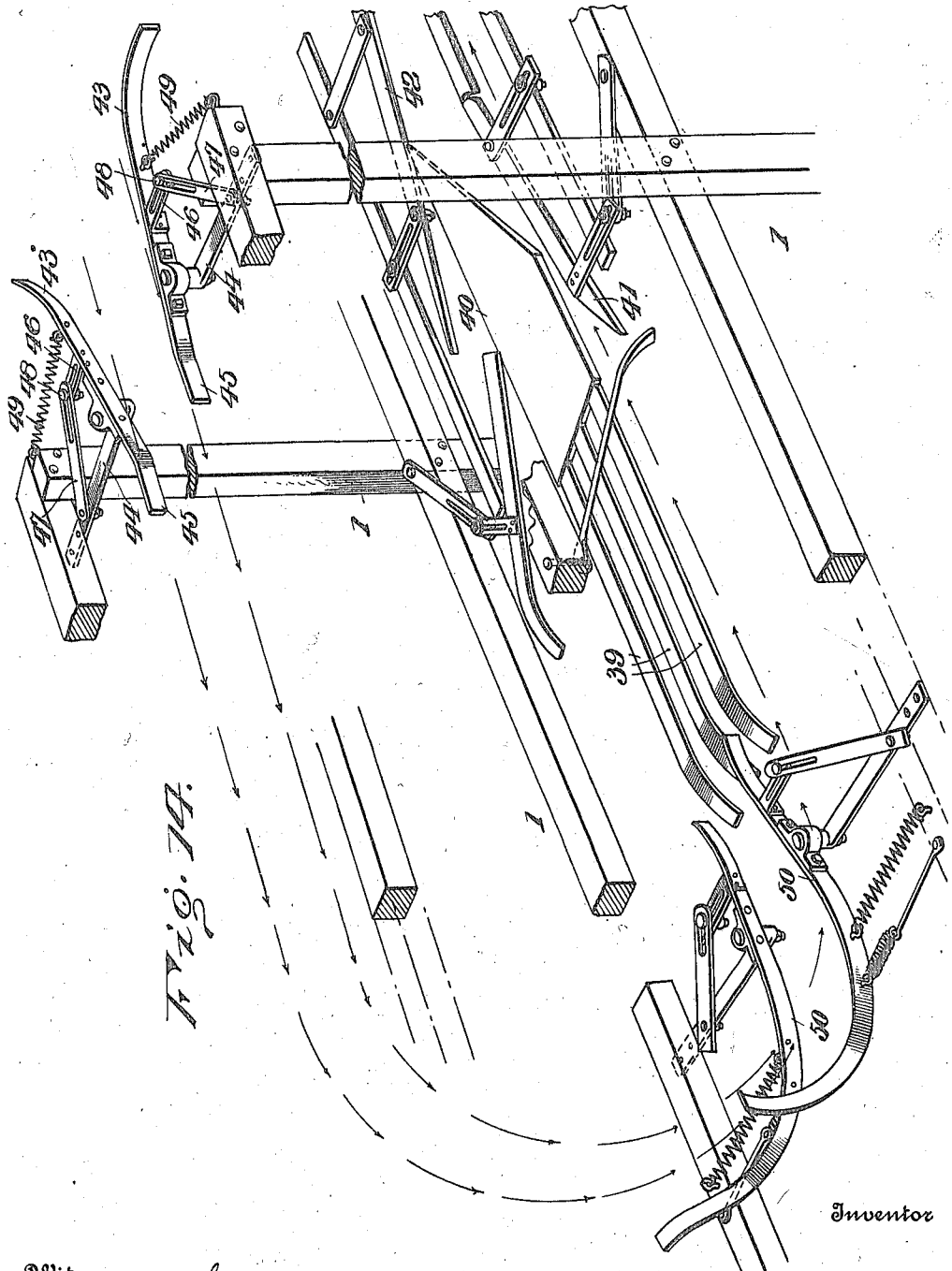

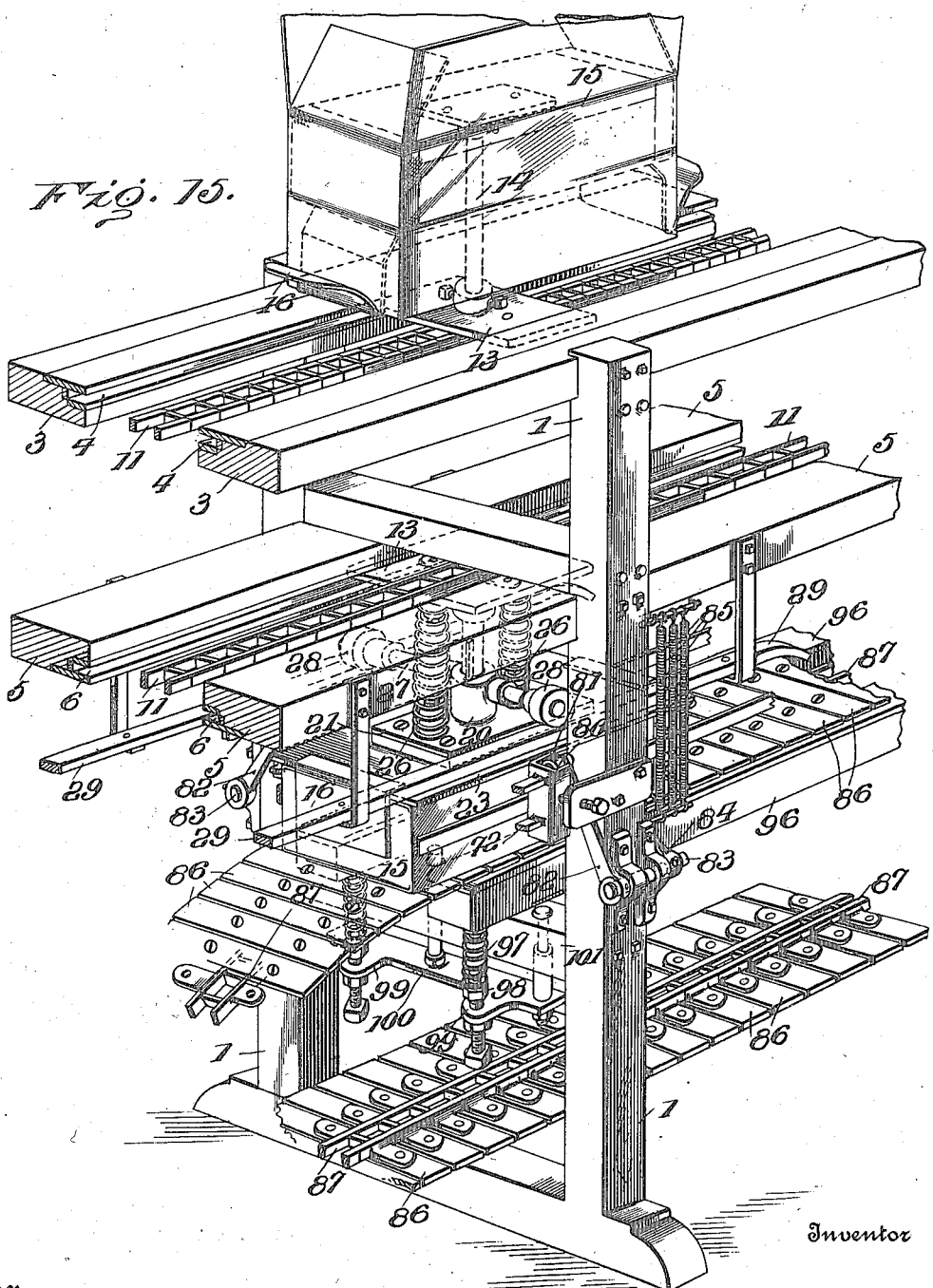

UNITED STATES PATENT OFFICE.

FRANK B. MARTIN, OF BATTLE CREEK, MICHIGAN, ASSIGNOR TO POSTUM CEREAL CO., LTD., OF BATTLE CREEK, MICHIGAN, A PARTNERSHIP ASSOCIATION OF MICHIGAN.

CARTON-MAKING AND FLAP-SEALING MACHINE.

1,136,354.  Specification of Letters Patent.  Patented Apr. 20, 1915.

Application filed January 14, 1914. Serial No. 812,094.

*To all whom it may concern:*

Be it known that I, FRANK B. MARTIN, a citizen of the United States of America, and resident of Battle Creek, Michigan, have invented a new and useful Improvement in Carton-Making and Flap-Sealing Machines, which invention is fully set forth in the following specification.

This invention relates to the art of making cartons or boxes of fibrous material, such as paper or paper-board, and, after such boxes have been filled, sealing the same, and has for its object to provide a machine capable af automatically making boxes or cartons of a single size or of a plurality of sizes, as may be desired, and delivering the boxes at any desired point; and (after the boxes or cartons have been filled by hand or otherwise) automatically sealing the same, and then transferring the sealed boxes or cartons to a store-room or other desired point of delivery.

For the purpose of illustrating the invention, it will be described in connection with the manufacture of packing cartons or boxes composed of paper-board, and the sealing of the same. Such boxes are generally made of considerable size and of heavy material, in order to stand the rough usages of transportation. But while the invention is described in connection with such packing cases or boxes, it is not limited to this particular class of box or carton, since it is capable of use in connection with cartons of any desired size, whether the same are desired for use as shipping cases or as original packages.

One of the objects of the invention is to provide a machine which shall occupy a comparatively small amount of factory floor space, and which shall be capable, at the will of the operator, of making cartons or boxes of several sizes, delivering the boxes to a packing room, where they may be filled with articles such as other small cartons containing merchandise, for example, and returning from the packing room to the machine, which machine, without any particular regard to the order in which boxes of different sizes are delivered, shall then take the filled boxes or cartons and effectually seal them, and transfer them to any desired point of delivery, as for example, to a warehouse or store-room.

With this object in view, the invention consists in the construction, combination and arrangement of elements hereinafter illustrated and described.

The inventive idea is capable of receiving a variety of mechanical expressions, one of which, for the purpose of illustrating the invention, is shown in the accompanying drawings, but it is to be understood that such drawings are for the purpose of illustration only, and are not designed to define the limits of the invention, reference being had to the accompanying claims for this purpose.

In said drawings,—Figures 1 and 1ª, taken together, show a side elevation of the machine; Fig. 2 is a plan view of that portion of the machine illustrated in Fig. 1; Fig. 3 is a vertical section on the line 3—3 of Fig. 1ª looking in the direction of the arrows; Figs. 4 and 5 show two plan views of corner-truing devices; Fig. 6 is an enlarged broken perspective view of the traveling platform to which the boxes are transferred after the flaps thereof have been folded and glued, either in the act of making the boxes or of sealing the boxes; Fig. 7 is a side elevation, partly in section, of the platform on which the boxes are received, and by which they are carried forward for the purpose of sealing the same after they have been filled; Fig. 8 is a detailed perspective of the carrier and its associated mechanism by which the filled box is received when it is delivered from the packing room, and from which it is transferred to the carrier, which advances it through the sealing mechanism; Fig. 9 is a detailed perspective illustrating the mechanism by means of which the empty boxes as made are directed to the packing-room or other point of delivery, and the filled boxes are directed to the store-room or other point of delivery; Fig. 10 is a broken elevation of the corner-truing mechanism illustrated in Figs. 3, 4 and 5; and Fig. 11 is a detail thereof; Fig. 12 is a perspective view showing the mechanism for turning in the end flaps of the boxes, whether in making the boxes in the first place or in sealing the filled box; and Fig. 13 is a broken side elevation of a portion of said mechanism; Fig. 14 is a broken perspective illustrating the truing devices by means of which the boxes are properly directed to the glue-applying devices, and also showing, in part, the means for turning the flaps to effect the sealing thereof after the glue is applied; and Fig. 15 is a broken detailed perspective of that part of the machine shown in the right-hand portion of Fig. 1ª.

Referring to the drawings, in which the same reference numerals are employed to indicate corresponding parts in the several views, the frame, composed of the uprights 1 and suitable horizontal bars 2, supports the working parts of the machine.

Supported by the uprights 1 are two longitudinally extending horizontal members 3, 3, placed opposite each other, and having on their interior edges or faces grooves 4, 4, preferably composed of metal wear-plates, as shown in Fig. 15, and immediately below the members 3, 3, are corresponding members 5, 5, having grooves 6, 6, the members 3 and 5 being exactly similar to each other in every respect, except that the grooves 4 of the members 3 are at the upper interior corner of the members, while the grooves 6 of the members 5 are at the lower interior corner of said members, all as clearly illustrated in Fig. 15.

Referring to Figs. 1 and 1ª, 7 is a sprocket-wheel mounted on a shaft 8, which shaft is driven by a sprocket-wheel 9 propelled by a sprocket-chain 10, extending to any suitable source of power, and 11 is a sprocket-chain passing around the sprocket-wheel 7 and driven thereby, said sprocket-chain also extending around a second sprocket-wheel 7' on the shaft 12 (Fig. 1), which last-mentioned sprocket-wheel is only indicated in dotted lines in Fig. 1. Sprocket-chain 11, shown in dotted lines in Figs. 1 and 1ª and in full lines in Figs. 6 and 15, has a series of plates 13 secured thereto at suitable intervals. The plane of travel of the upper stretch of the chain 11 is in the plane of the grooves 4, 4, in the members 3, 3, and the ends of the plates 13 on the chain 11 travel in, and are guided by, said grooves on the upper stretch of the chain. Similarly, the grooves 6, 6, of the members 5, 5, are in the plane of the lower stretch of the chain 11, and the ends of the plates 13 travel in the grooves 6, 6, on such members. On every alternate plate 13 secured to the chain 11, there is mounted a standard 14, projecting from the center of the plate and normal thereto, and mounted on the ends of the standard 14 are box-forming blocks 15, one of which is shown in dotted lines in Fig. 6. Preferably, these blocks are hollow as shown, and the size of said box-forming blocks conforms to the interior size or dimensions of the box to be made thereon. Two of these box-forming blocks 15 are shown in full lines in Fig. 1. At each end of said blocks 15 there are bracket-hooks 16, 16, which depend from the blocks 15 that are on the upper stretch of the chain, but project upward from said blocks 15 which are on the lower stretch, all as will be understood by an inspection of Fig. 1. These bracket-hooks 16 support the box-blanks 17 (see Fig. 1ª) when the blank is opened and placed thereon, the proportion of the parts being such that the flaps which are to form the bottom of the box will rest upon the tops of the blocks 15 when turned down and sealed in making the box.

The box-forming blocks 15 are evenly and uniformly spaced on the carrier chain 11, so as to leave a space between the adjacent blocks 15. Mounted on each plate 13, between the box-forming blocks 15 on the chain 11, are standards 18 (see Figs. 1, 6 and 7), each of which standards is provided with a vertical rib 19. A sleeve 20 is mounted on the standard 18, and has a notch therein engaging the rib 19 on the standard, so that the sleeve is capable of longitudinal movement on the standard, but is prevented from turning thereon.

Mounted on the sleeve 20 is a plate 21, preferably provided with a pair of projecting guides 22, 22, on one side thereof, and on the other side thereof is mounted a platform 23, which is secured to the plate 21 by means of bolts 24, 24, as clearly shown in Fig. 7.

At each end of the platform 23 is an end wall 25, the two end walls being a sufficient distance apart to receive a box on the platform, and between the end walls 25, 25, as hereinafter explained. Each of the plates 13 to which standards 18 are secured, has guide-lugs 22', 22', projecting therefrom, and springs 26, 26, reacting between the plates 13 and 21, being guided by the respective guides 22, 22', as will be readily understood by an inspection of Fig. 7. A stop 18' limits the outward movement of the sleeve 20.

Referring to Fig. 6, two rods 27, 27, project laterally from the sleeve 20, and on their outer ends are provided with anti-friction rollers 28, 28.

Referring to Fig. 1ª, 29 is a rail mounted on and supported by brackets 30 carried by the frame of the machine. There are two of these rails, one on each side of the machine, and carried by the brackets 30 inside of the frame proper of the machine. Referring still to Fig. 1ª, the right-hand end of the rail 29, it will be observed, projects slightly upward, and is downwardly inclined, extending from right to left for a short distance, and thereafter is parallel with the chain 11. The upper stretch of said chain 11 moves in the direction of the large arrow at the top of Fig. 1ª, and the rollers 28 pass under the rails 29, and act to lower the platform 23. These spring-mounted platforms 23 are designed to receive the boxes that have been filled and are to be passed through the machine for the purpose of sealing the boxes, and the position of the rails 29 is such that they act in conjunction with the rollers 28 to depress the platform 23 to such an extent that the highest box which is designed to be sealed upon the machine will readily pass through the apparatus to be hereinafter described.

The guide-members 3 and 5 terminate at the left-hand end of the machine, as shown in Fig. 1ª, at the extreme left-hand standard, and the plates 13 pass from the guide-grooves in members 3 and around the sprocket-wheel 7, thus completely inverting the box-forming blocks 15 and the box-receiving platforms 23, as will be readily understood by inspecting Fig. 1ª. At this point the plates 13 enter the guide-grooves 6, 6, in the members 5, 5, and thereafter the box-forming blocks or the box-supporting platform, as the case may be, travel in inverted position.

The means for effecting the closure of the bottom of the box, when a box is being made, or the top of the box after the same has been filled, may be of any usual or desired form, and is located at the left-hand end of the machine, as viewed in Fig. 1ª. Since the specific construction of this end-closure mechanism forms no part of the present invention, it has not been illustrated in detail, only so much of it being shown as is necessary to understand the operation of the invention as a whole. The end flaps are tucked or folded in, and the side flaps folded out, just before the box makes the turn around the sprocket-wheel 7, the forward end flap being turned in by any suitable or usual device employed in the art for this purpose, such, for example, as the spring plate 31 (Figs. 1ª and 12), with its bifurcated upturned end 32 positioned in the path of the upwardly projecting end flap of the advancing box, whereby the forward end flap is turned downward, immediately after which the revolving flap tucker 33 turns down the rear end flap of the box. The side flaps are opened out by means of two cam rods, one of which, 34, is shown in Fig. 1ª. The end flaps being turned in and the side flaps turned out, they are held in that position as the box makes the turn around the sprocket-wheel 7, by a semi-circular end wall 35, preferably of sheet metal, the open side flaps and the inturned end flaps resting against the interior face of this end wall until the box is completely inverted, whereupon the side flaps are passed over the usual or any suitable glue-applying rolls, located on opposite sides of the machine, in position to apply glue to the side flaps. These rolls are mounted on the shaft 36 (Fig. 1ª) over a reservoir 37 containing liquid glue, the flaps being held in contact with the glue-applying rollers by superposed rollers one of which, 38, is shown in Fig. 1ª.

In order that the end flaps may be retained in their inturned position and the contents of the cartons within the same while the glue is being applied to the side flaps, there is provided a platform, here shown as composed of three parallel slats 39, whose ends adjacent to the end wall 35 are downwardly inclined, as will be readily understood from an inspection of Fig. 14. As the box is inverted and leaves the end wall 35, the end flaps pass upon, and are supported by, the platform slats 39. As the box is advanced along this platform and along an extension 40 thereof, the side flaps having the glue applied thereto are turned in by the usual cam-acting side flap folding devices 41 and 42, placed the one slightly in advance of the other, as is common in this art.

When a filled box is placed on the machine to be sealed, it rests on the platform 23, as before stated, and it is necessary, in order that the sealing operations may be performed with accuracy, that the box be truly placed on the platform, that is, with the sides of the box parallel with the sides of the machine, and approximately in the center thereof, since if the box was turned into an angular position slightly transverse to its line of movement through the machine, the sealing operation could not be properly performed. For the purpose of truing the box, therefore, two sets of truing devices are provided, which are similar in construction, and consequently the description of one will serve for both.

Referring to Fig. 14, 43, 43, are two guide plates or bars pivotally mounted on brackets 44, 44, on opposite sides of the machine, so that the forward ends 45, 45, of said bars converge toward each other in the direction of travel of the box, the opposite ends of the bars being outwardly divergent, as will be readily understood from the drawing. These guide bars are held with their convergent end portions parallel by a toggle joint construction consisting of rearwardly projecting slotted lugs 46 and slotted links 47, which links have one end pivoted to the bracket bars 44, while their slotted ends are connected to the slotted lugs 46 by bolts 48 projecting through the slots of the two members. This construction permits the guide bars 43 to turn on their pivots, but restricts the turning movement, so that the converging ends 45 form, as it were, a lane slightly yielding, between which the advancing box has to pass. The guide bars are also under the yielding action of springs 49, 49. When a box that is angularly placed upon one of the platforms 23 passes between these guide bars, it is trued up or straightened upon the platform, and if, by any chance, its true advance-line position is disturbed as it makes the turn around the end wall 35, it is again restored to its proper position by the truing bars 50, 50, whose construction and operation is in all respects similar to that of the devices just above described.

The end flap tucker 33 is preferably of the form shown in Figs. 1ª and 12, and is mounted on a transverse shaft 51 (Fig. 12), operated from a shaft 52 through the sprocket-chain 53 and coöperating sprocket-wheels. The shaft 52 is intermittently turned by means of a pawl 54 engaging a ratchet 55 secured to the shaft 52. The pawl 54 is pivoted to a bar 56 mounted to turn loosely on the shaft 52 as an axis, and this bar is connected by a rod 57 with an eccentric 58 driven from shaft 8, through a sprocket chain 59. It is essential, in order that the tucker 33 shall operate properly, that each pause shall leave the tucker in the position illustrated in Fig. 12, so that one curved tucker arm 33' shall be in position for the forward end flap to pass thereunder, while the other tucker arm 3'' shall occupy such position that, when it is turned in the direction indicated by the arrow, it will quickly tuck in the rear end flap. It is therefore essential that the pawl and ratchet 54—55 should so coöperate as to always impart to the shaft a certain part of a revolution (here shown as one-fourth of a revolution); should be provided with means to prevent overthrow; and also provided with means for preventing backlash or backward movement of the parts after they have been thrown.

Referring to Fig. 12, 60 is a rock shaft having suitable bearings in the frame of the machine, and on the end of this shaft is keyed a slotted quadrant 61, whose opposite end is secured to the downwardly projecting end of the bar 56 by means of a bolt 62 extending through the slot in the quadrant. This quadrant has an upwardly projecting lug 63, and as the bar 56 is rocked from left to right in Fig. 13, the quadrant 61, and with it the lug 63, is elevated by reason of the engagement of the bolt 62 in the slot 61' of the quadrant 61, which slot is slightly eccentric to the shaft 52. This elevates the lug 51 into the path of one of the ratchets 64 on a second ratchet-wheel keyed to the shaft 52 inside of the ratchet-wheel 55, thereby acting as a stop to prevent any possible overthrow by the action of the pawl 54. To prevent back-lash, when the pawl 54 is withdrawn to repeat the stroke, a rod 65 is mounted in a suitable bracket 66 on the frame of the machine, and has an inwardly projecting end 67. This bar 65 is pivoted in the bracket 66, and is provided with a counter-weight 68. As the ratchet-wheel 65 is revolved, it rides up the cam surface on the rear face of the ratchet-tooth, and at the end of the stroke of the pawl 54, it drops over and in front of the front face, thereby preventing any backward movement or back lash as the pawl 54 is withdrawn to repeat the stroke. These two parts, the lug 63 and the stop 67, act between them to fixedly hold the shaft 52, and therefore the tucker 33, in the exact position desired.

When the flaps constituting the bottom or the top of a box, as the case may be, pass off of the supporting platform 40 (Fig. 14), all of the flaps have been closed, and the outer and lower flap passes onto a medially placed spring blade 69, which is upwardly and forwardly inclined, as shown in Fig. 1ª, the spring blade being preferably curved, as shown in said figure, and secured to a portion of the frame-work. In order that the corners of the bottom of a box when a box is being made, or the corners of the top of a box, when the box has been sealed, may be trued and squared, they are passed between a pair of truing rollers 70, 70 (Figs. 1ª and 10). These rollers have a vertically projecting part 70' and a horizontal part at right-angles thereto, and are mounted on and keyed to vertical shafts 71, 71, turning in bearings carried by bracket-arms 72, 72, mounted to turn loosely on vertical shafts 73, 73, having suitable bearings secured to the frame-work. The upper ends of the shafts 71, 71, are provided with sprocket-wheels, and corresponding sprocket-wheels are keyed to the shafts 73, 73, and around such sprocket-wheels are sprocket-chains 74, 74, so that the truing rolls 70, 70, are driven from the shafts 73, 73, which are connected by bevel gears 75, 75, with the shaft 76 driven by sprocket-chain 77, receiving power through suitable sprocket-wheels and chains from the power-chain 10.

The upper bracket-arms 72 are bifurcated, as shown in Fig. 11, so that there is a bearing 78 for the shaft 71 in each fork of the bracket 72, and also a double bearing of said bracket-arm on shaft 73, such bearings being shown at 79 (Fig. 11). The end of the bracket-arm 72 is provided with an abutment, here shown in the form of a U-shaped groove 80, in which plays a roller 81, offset from an arm 82 on a rock-shaft 83, which shaft is mounted in suitable bearings on the frame of the machine, and is provided with an arm 84 keyed thereto, and to which is applied spring tension, here shown in the form of a plurality of springs 85 (Fig. 10).

Referring to Fig. 10, it will be seen that if the rollers 70, 70, are spread apart or opened out, this will be accomplished by turning the bracket-arms 72, 72, on the shaft 73, and that this will be resisted by the spring 85, through the action of the anti-frictional bearing 81 in the groove 80. In other words, the springs 85 operate with considerable tension to hold the rolls 70—71, firmly, but yieldingly, in the relative positions shown in Fig. 10.

Referring to Figs. 1ª and 10, as a box leaves the spring-supporting blade 69, it is advanced with its outer edges resting upon the horizontal flanges of the rolls 70, 70, which are held by the springs 85 at a distance apart slightly less than the width of the box (see Fig. 4), so that the vertical portions 70', 70', of said rolls are pressed firmly against the sides of the box by the springs 85, and this, acting in conjunction either with the weight of the box, if the same is filled, or with the surface of the box-forming block, if a box is being made, serves to true or square up the corners of the box (see Figs. 3 and 5).

As the box passes from the truing rolls 70, 70, it passes onto a platform composed of a series of transverse slats 86, secured to a sprocket-chain 87 (Figs. 1, 6 and 15), passing over a sprocket-wheel 88 at one end on a shaft 89 (Fig. 6), and at the other end over a sprocket-wheel 90 on a shaft 91 (Fig. 1), which latter shaft is connected through suitable gears 92 and 93 to a shaft 94, driven by sprocket-chain 95, receiving power from the shaft 12, as will be plain from an inspection of Fig. 1. This sprocket-chain platform 86—87 is one of considerable extent, and is designed to hold the inturned glued flaps of the just-made box, or of the sealed tops of the box, as the case may be, firmly in position until the glue has set. The slats 86 of this platform travel over two side-bars 96, 96 (Figs. 1ª, 6 and 15), which serve to hold the platform level. These side-bars are yieldingly supported at their ends by springs 97, 97, which act to press the bars upward with considerable force, to the end that the box flaps may be held firmly in position while the glue is drying. Said springs rest at one end on the under side of the bars 96, as shown, and on their lower ends rest against an adjusting bolt 98, screw-threaded through bracket-arms 99, 99, projecting from a plate 100, supported from cross-bars 101, forming a part of the frame-work of the machine, as will be readily understood from an inspection of Figs. 6 and 15.

Referring now to Fig. 1, when the boxes leave the sprocket-chain slat-platform 86—87—in other words, when said platform makes the turn around the sprocket-wheel 90—the box is no longer supported, and is permitted to drop to a lower level down an incline 102 onto a traveling belt 103, passing over suitable driving rollers 104, 104', as shown in Fig. 1. These rollers 104 104' are keyed to shafts 105, 105', respectively. The shaft 105 has a sprocket-wheel 106 keyed thereon (Figs. 1 and 9), over which passes a sprocket-chain 107, driven from shaft 108.

The belt 103 is a broad belt, over twice the width of the boxes, and is a distributing belt, which acts in conjunction with an oscillating gate 109 to direct the empty boxes onto a belt 110 (Figs. 1 and 9), leading to the packing room, and the filled and sealed boxes to a belt 111, leading to the warehouse or other point of delivery.

The oscillating gate 109 is keyed to a vertical shaft 112 turning in bracket-bearings 113 secured to the frame-work of the machine. The oscillations of this shaft (and with it, the gate 109) are so timed as to place the gate in the position shown in full lines in Fig. 9 at the time when an empty box is delivered to the belt 103, and in the position shown in dotted lines in Fig. 9 when a filled and sealed box is delivered to said belt. Referring to Fig. 1, the gate 109 is shown (in full lines) in position to direct a sealed box onto the belt 111, and the box is shown in the act of passing the gate, an empty box having just previously passed the gate and been delivered to the belt 110.

The mechanism for effecting the oscillations of this gate and timing the same is best shown in Figs. 1 and 9. Keyed to the shaft 112 is a lever-arm 114, having an eye 115 pivoted thereto, and a rod 116 passes through said eye, and has two springs 117 and 118 mounted on the rod, on the respective sides of the eye 115, and reacting between said eye and the nuts 119 and 120, adjustably secured on the rod 116. This gives a yielding connection between the rod 116 and the shaft 112. The rod 116 has a slot 121, through which passes a shaft 122, which serves to guide and support the rod. Projecting laterally from the rod at each end of the slot 121, are pins 123, 123', and keyed to the shaft 122 is a cam 124. The shaft 122, and with it the cam 124, revolves in a direction reverse to the hands of a clock. When the cam impinges upon the pin 123, it throws the rod 116 to the left (Fig. 9), and when it impinges upon the pin 123', it throws the rod 116 to the right in said Fig. 9. And between the time when it leaves pin 123 and impinges upon pin 123', the rod 116, and therefore the gate 109, stands at rest. There is thus imparted an intermittent oscillatory motion to the gate 109. And these intermittent oscillatory movements are so timed as to have the gate in a position to direct an empty box to the belt 110, just after said box comes down the incline 102; and likewise to direct a filled and sealed box to the belt 111 after such box comes down the incline onto the belt 103.

In case there should be any miscarriage in timing the parts, so that a box should be partially in front of the gate as it was in the act of making its oscillation (which would result in crushing the box between the gate and the frame of the machine, or straining and breaking the machinery), the connection between the rod 116 and the shaft 112 is made yielding, as indicated above. Preferably, also, the gate 109 is composed of heavy sheet metal or other flexible material, and if the oscillation of the gate should catch a box at the wrong instant, one of the springs 117 or 118, as the case might be, would yield to the thrust of the cam 124, and the flexible gate 109 would also yield, until the cam had passed the pin 123 or 123', as the case might be, and the box would continue on its way, without injury to the box or undue strain upon the machinery, and all of this without in any way interfering with the proper timing of the parts thereafter.

Shaft 122 is driven by sprocket-chain 125, which in turn is driven from shaft 94 (see Fig. 1), and the timing is effected by properly proportioning the teeth on the sprocket-wheels on the respective shafts 94 and 122, as will be readily understood.

The belt 110, which receives the empty packing-box, conveys the same to the packing-room or other point of delivery. The packed box is returned to the machine for sealing by the conveyer-belt 126, on which belt the filled box may be placed, either directly by the operator, or it may be delivered to said belt 126 by another intermediate conveyer, not shown.

Referring to Fig. 1, there is shown a packed box 127, resting with one end on the belt 126, and with its forward lower corner engaged by a stop 128, which is here shown in the form of an upwardly projecting spring-blade extending but a slight distance above the line of travel of the box on the belt 126. When the box comes in contact with this stop 128, the belt 126 continues to move thereunder, while the box itself remains at rest, until it is freed from the stop by the mechanism which will now be described, referring more particularly to Figs. 1 and 8. The belt 126 delivers the box in line with a traveling platform consisting of slats 129, secured to a sprocket-chain 130, driven by sprocket-wheel 131 on shaft 132, receiving power through sprocket-wheel 133, and sprocket-chain 134, driven from shaft 12 (see Fig. 1). The opposite end of the sprocket-chain 130 passes over a suitable sprocket-wheel on shaft 135 (Figs. 1 and 8). The slat platform 129 is continuously driven, and has secured thereto at regular intervals follower bars 136, which bars are provided with notches or slots 137, to enable the bars to clear the stop 128.

Mounted on the frame-work of the machine at one side of the slat platform 129 is a bar 138, whose free elastic end 139 is bent so as to extend diagonally across the line of travel of the slat platform 129 (see Figs. 2 and 8). Keyed to a shaft 140, turning in suitable bearings on the frame-work of the machine at the side of the slat platform 129, is an arm 141, extending horizontally over the platform in the line of travel of the boxes, and the shaft has a lever-arm 142 keyed thereto, to which is secured a spring 143, the other end of the spring being secured to a bracket-arm 144 on the frame, the whole being so arranged that the stop-arm 141 may be thrown to one side of the slat platform against the tension of the spring 143, and when the pressure, acting on the arm 141, is relieved, the spring promptly returns it to its position above the platform.

Referring to Figs. 1, 2 and 8, when the box 127 impinges against the stop 128, the belt 126 continues to move thereunder, and would advance the same onto the slat platform 129, but for said stop 128. When one of the bars 136 on the platform 129 rises under the forward end of the box 127, it acts to lift it above the stop 128, the slot 137 enabling the bar to clear the stop. When the box is free from the stop, the belt 126 advances it until its front end rests well upon the slats 129, and just to the rear of that follower bar 136, which has lifted it off of the stop 128, and thereafter the moving slat platform 129 continues to advance the box until it engages the yielding stop 141, whose spring is stiff enough to overcome the friction between the box and the platform, and stop the box until the next succeeding follower bar 136 firmly engages the box, and advances it, turning the stop 141 against the tension of the spring 143, the box being advanced along in close proximity to the rail or bar 138. As the box advances, it comes in contact with the diagonally inclined front portion 139 of said rail. This front portion, although yielding and elastic, is yet quite stiff, and its action is to slide the box laterally off of the slat platform 129. The box is thus moving simultaneously laterally and forward, and the lateral movement occurs at the time when one of the platforms 23 on the sprocket-chain 11 is opposite the box. And the result is that, as the slatted platform 129 and the receiving platform 23 move parallel with each other, and at the same speed, the box is crowded off of the slat platform onto the platform 23, by the inclined rail 139, this occurring at just the point where the slat platform descends to make its return movement. Immediately adjacent this end of the slat platform 129 is placed a permanent table 145 (Fig. 1). In case any box should become slightly displaced on the platform 129, or there should be any failure to exactly time all of the parts, it will be apparent that, when the box is slid from the platform 129 to the receiving platform 23 by the diagonally disposed front end 139 of the rail 138, the box would be liable to impinge upon the upwardly projecting end plates 25 of the platform 23, resulting either in injury to the box or to the machinery, but for the fact that the free end 139 of the rail is elastic, and in this case it would yield and be pushed back from over the traveling platform 129, and the follower bars 136 would then advance the box onto the table 145, where it would remain until the operator picked it up and placed it on the platform 23. Instead of relying entirely upon the elasticity of the inclined end 139 of the rail 138, this may, if desired, be supplemented by a spring 146 (Fig. 1) engaging the end of a rod 147 to return the part 139 to its normal position when it has been forced from over the platform, as above described.

The platforms 23, as heretofore mentioned, alternate on the sprocket-chain 11 with the box-forming blocks 15, and the filled boxes are advanced to the sealing mechanism, and through the machine, and then to the warehouse, as hereinbefore described.

It will be observed that, in connection with Figs. 2 and 8, it is a matter of indifference as to the speed with which the filled boxes are brought up to the machine by the belt 126. They may be close together, or they may be widely distributed upon such belt, without in any way interfering with the correct timing of the parts, so as to cause the filled boxes to be delivered to the platforms 23. If two boxes are in close juxtaposition on the belt 126, one of them is freed from the stop 128 by the bars 136, and the other one is immediately advanced by the belt 126 until it comes in contact with said stop 128, where it awaits the next follower 136, which acts to free the second box and to pick up the first box 127, and advance it past the spring stop 141, which stop immediately returns to position to stop the box following, and hold it to await the coming of the next follower bar 136. It is therefore clear that these boxes can only be advanced by the slat platform at intervals determined by the spacing of the follower bars 136, and these are so spaced, and their movements so timed, that they will advance the boxes into contact with the flexible spring rail 139 at the proper time for the latter to push them off upon the platforms 23. If, on the other hand, the boxes are delivered to the machine by the belt 126 at widely separated intervals, no box can be delivered to the slat platform 129, except by the action of the follower bars 136, which thus absolutely determine the timing of the delivery of the boxes to the carrier platform 23, regardless of the rate at which such boxes may be brought to the machine by the belt 126.

Operation: In operating the machine, the workman opens the carton-blanks designed for making the empty cartons, and places them upon the box-formers, as shown at the extreme right of Fig. 1ᵃ. These box-formers may be of the same size, or, if desired, they may be of a plurality of sizes, and in practical operations I have used three different sizes. The blanks thus placed upon the formers are advanced by the carrier-chain 11 to the left-hand end of the machine, where the end flaps are folded in by the end-flap folders 31, 33, and the side flaps opened out by the cam rails 34, and with the end flaps thus folded in and the side flaps opened out, the blank is passed around the turn in the machine with said flaps against the end wall 35, until the parts again assume a horizontal or inverted position, when they are passed through the box-flap-sealing devices, consisting of the gluing rolls and the flap-turning members. During this application of the glue to the side flaps and advancing the same along to the point where the side flaps are turned in, the end flaps are retained in their inturned position, by reason of the fact that the inverted blank rests with the end flaps upon the supporting platform composed of the rails 39 and the part 40. The box having thus had its bottom flaps glued and turned in, is then passed between the truing rolls 70, 70, as shown in Figs. 3, 4, and 5, and onto the slatted platform or endless conveyer composed of the slats 86 and the chain 87, which is of sufficient length to enable the glue to set while the boxes are passing along in contact therewith. This traveling platform moves at the same rate of speed as the chain 11, and being forced toward the box with yielding pressure, due to the springs 97, acts to hold the flaps firmly in position. The box as it passes from the slatted platform 86 is without support, as will be understood from an inspection of Fig. 1, and it therefore drops freely from the box-former down the incline 102, and onto the belt 103, by which it is advanced past the gate 109, whose movement, as hereinbefore described, is so timed as to direct the box onto the belt 110, by which belt or other coacting conveyer it is carried to the point of delivery, such as the packing-room. The box having been packed, is then placed directly on the conveyer 126, or upon some other conveyer which acts to place it on the conveyer 126, by which latter it is delivered, at the proper time, to the conveyer 129, and advanced by the followers 136 thereon, to be shifted laterally off of the conveyer 129 and onto the box-carrier or platform 23, by which it is passed through the box-flap-sealing devices, the end flaps being tucked in, and the side flaps opened, glued and turned in, precisely as described in connection with the making of the empty boxes. Just before the box-carriers are advanced to the end-flap-folding devices, the rollers 28 thereon pass under the rails 29, thereby acting to depress the box-carrier to such a point that any one of the sizes of boxes designed to be sealed by the machine may readily pass under the end-flap tuckers, and as the box with its contents is passed by the chain 11 around the turn, its end flaps are held turned in and its side flaps opened out, by contact with said wall, and when the box reaches its inverted position, it falls by gravity slightly away from the carrier platform 23, as illustrated at the left-hand end of Fig. 1ª, in which position it is advanced through the box flap-sealing devices, either contacting with the platform 23 or slightly separated therefrom, depending upon the height of the particular box being sealed. After it has passed through the truing rolls 70, 70, still in inverted position, the rolls 28, 28, pass from over the rails 29, and thus permit the springs 26, 26, to force the carrier platform 23 down tightly against the box, thereby holding it in firm contact with the yielding slat platform 86—87, as clearly illustrated at the right-hand of Fig. 6. When the box reaches the right-hand end of this pressure platform 86—87, it drops freely down the incline 102, onto the belt 103, and this delivery to the belt 103 occurs at a time when the gate 109 is in the dotted line position of Fig. 9, thus causing the box to be fed by the belt 103 to the left-hand side of said belt in Fig. 9, from which it is delivered to the conveyer belt 111, and by it, either alone or in conjunction with other conveyers, the box is delivered to any desired point, such as a warehouse room.

It will thus be seen that my machine is capable of simultaneously manufacturing boxes of a plurality of sizes, and concurrently with this manufacturing of the boxes and delivery of the same to the packing-room, it receives and seals boxes of a plurality of sizes, and delivers them to suitable points, such as a warehouse room.

While I have thus described my invention with a considerable degree of particularity, it will be apparent to those skilled in the art that there are numerous changes from the specific construction described that may be made by the ordinarily skilled mechanic, without departing from the principles or inventive idea involved in the machine as I have described it. The appended claims are intended to define not only the specific machine as herein described, but also all such modifications thereof as may fall within the terms of said claims.

What is claimed is:—

1. In a machine of the character described, the combination of an endless conveyer, equally spaced box-carriers arranged thereon, and yielding connections between said carriers and conveyer, with box-flap sealing devices beneath the lower stretch of said conveyer, and a box-supporting traveling platform also beneath the lower stretch of the conveyer.

2. In a machine of the character described, the combination of a conveyer traveling in two different horizontal planes, carton-formers and carton-carriers alternately arranged on said conveyer, means folding in the end flaps and opening out the side flaps of carton-blanks on the formers and of cartons on the carriers while moving in the upper plane, flap-sealing devices acting on said blanks and cartons in the lower plane, and means retaining the contents of the cartons therein during the sealing operation.

3. In a machine of the character described, the combination of a conveyer, carton-carriers secured to said conveyer by yielding means which permit said carriers to move to and from said conveyer in a direction normal to its line of travel, and a series of flap-sealing devices acting on the cartons as they are advanced by the conveyer.

4. In a machine of the character described, the combination of an endless carton-supporting conveyer moving in two planes one above the other, whereby the cartons are inverted in passing from one plane to the other, flap-sealing devices completing the sealing operation when the cartons are in the lower plane, means squaring the corners after the flaps are sealed, and means retaining the flaps in sealing position as the cartons pass from the sealing devices to the corner-squaring means.

5. In a machine of the character described, the combination of an endless conveyer moving in two horizontal planes, carton-formers and carton-carriers thereon, a single series of flap-sealing devices acting on the blanks on the formers and the cartons on the carriers while inverted, means retaining the contents therein during the sealing operation, whereby empty cartons are made and filled cartons are sealed, and means conveying the empty cartons to one delivery point and the sealed filled cartons to another delivery point.

6. In a machine of the character described, the combination of flap-sealing devices, corner-truing devices, and means holding the flaps closed while the glue sets, with means passing carton-blanks and filled cartons past said sealing devices, and means sealing the flaps on said blanks and cartons, whereby cartons are made and filled cartons sealed by the one machine.

7. In a machine of the character described, the combination of glue-applying and flap-folding devices operating on filled cartons when the latter are upside down, means retaining the contents of the cartons therein during the sealing operation, and a yielding traveling platform onto which the cartons are delivered upside down, whereby the weight of the cartons and their contents serve to hold the flaps closed till the glue sets.

8. In a machine of the character described, the combination of glue-applying and flap-folding devices operating on the filled cartons when the latter are upside down, means retaining the contents of the cartons therein during the sealing operation, a yielding traveling platform onto which the cartons are delivered upside down, and a conveyer to which the cartons are delivered by said platform.

9. In a carton flap-sealing machine, the combination of flap-sealing devices, means dividing the cartons acted on by said sealing devices into two lines, said means including an oscillating distributing gate, power devices for operating said gate, and yielding connections between said power devices and gate.

10. In a carton flap-sealing machine, the combination of carton flap-sealing devices, a conveyer advancing the cartons past said devices, a moving carton-support at one side of said conveyer, and a diagonally placed guide extending across the path of the cartons on said moving carton support,—whereby the cartons are transferred from said support to said conveyer.

11. In a carton flap-sealing machine, the combination of carton flap-sealing devices, a conveyer advancing the cartons past said devices, a moving carton-support at one side of said conveyer, and a yielding diagonally placed guide extending across the path of the cartons on said moving carton-support,—whereby the cartons are transferred from said support to said conveyer.

12. In a carton flap-sealing machine, the combination of carton flap-sealing devices, a conveyer advancing the cartons past said devices, a moving carton-support at one side of said conveyer, a diagonally placed guide extending across the path of the cartons on said moving carton-support, and means delivering the cartons to said moving carton-support.

13. In a carton flap-sealing machine, the combination of carton flap-sealing devices, means advancing the cartons past said devices, a moving endless conveyer arranged beside said advancing means, spaced followers on said conveyer, means supplying cartons to said conveyer, and a stop arresting the cartons before they are advanced onto said conveyer and from which stop they are released one at a time by said followers.

14. In a carton flap-sealing machine, the combination of carton flap-sealing devices, means advancing the cartons past said devices, a moving endless conveyer arranged beside said advancing means, spaced followers on said conveyer, means supplying cartons to said conveyer, a stop arresting the cartons before they are advanced onto said conveyer and from which they are released one at a time by said followers, and a yielding stop arresting the cartons on said conveyer until they are advanced by said followers.

15. In a carton flap-sealing machine, the combination of carton flap-sealing devices, means advancing the cartons past said devices, a moving endless conveyer arranged beside said advancing means, spaced followers on said conveyer, means supplying cartons to said conveyer, a stop arresting the cartons before they are advanced onto said conveyer and from which they are released one at a time by said followers, a yielding stop arresting the cartons on said conveyer until they are advanced by said followers, and a diagonally placed guide extending across the path of the cartons on said conveyer whereby the cartons are transferred to said advancing means.

16. In a carton flap-sealing machine, the combination of carton flap-sealing devices, a carton conveyer having carton-receiving supports uniformly spaced on said conveyer, whereby the cartons are advanced past said sealing devices, a moving endless carrier arranged beside said advancing conveyer, uniformly spaced followers on said carrier, means supplying cartons to said carrier, a stop arresting the cartons before they are advanced onto said carrier and from which stop they are released one at a time by said followers, a yielding stop arresting the cartons on said carrier until they are advanced by said followers, and a diagonally placed guide extending across the path of the cartons on said carrier, whereby the cartons are transferred one at a time from said carrier to the said carton-receiving supports.

17. In a carton flap-sealing machine, the combination of flap-sealing devices, a conveyer for advancing the cartons past said devices, carton-receiving platforms mounted on said conveyer, springs supporting said platforms, and means depressing said platforms against the springs while the cartons are passing the sealing devices.

18. In a carton flap-sealing machine, the combination of flap-sealing devices, a conveyer for advancing the cartons past said devices, carton-receiving platforms mounted on springs on said conveyer, means depressing said platforms against the springs while the cartons are passing the sealing devices but releasing them after the flaps are sealed, and means applying pressure to the sealed flaps in opposition to said springs, whereby the flaps are held in position until the glue has set.

19. In a machine of the character described, the combination of carton flap-sealing devices, a conveyer advancing cartons past said devices, a moving carton support and a stationary carton support at one side of said conveyer, and a yielding diagonally placed guide extending across the path of the cartons on said moving carton support, whereby cartons are transferred from said moving support to said conveyer in normal operation, and a misplaced carton is transferred from said moving support to said stationary support.

In testimony whereof I have signed this specification in the presence of two subscribing witnesses.

FRANK B. MARTIN.

Witnesses:
   Geo. W. Haines,
   Vern D. Sutton.